(12) United States Patent
Li et al.

(10) Patent No.: US 9,553,503 B2
(45) Date of Patent: Jan. 24, 2017

(54) METHOD FOR STARTUP CONTROL OF PHOTOVOLTAIC INVERTER, SYSTEM THEREOF, AND PHOTOVOLTAIC POWER GENERATION SYSTEM

(71) Applicant: SUNGROW POWER SUPPLY CO., LTD., Hefei (CN)

(72) Inventors: Xiaoxun Li, Hefei (CN); Zhiqiang Han, Hefei (CN); Haoyuan Li, Hefei (CN); Xiaodong Mei, Heifei (CN); Touming Wu, Hefei (CN); Chao He, Hefei (CN); Yang Song, Hefei (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 24 days.

(21) Appl. No.: 14/813,727

(22) Filed: Jul. 30, 2015

(65) Prior Publication Data
US 2016/0065053 A1 Mar. 3, 2016

(30) Foreign Application Priority Data

Aug. 27, 2014 (CN) .......................... 2014 1 0427714

(51) Int. Cl.
*G05F 1/56* (2006.01)
*H02M 1/36* (2007.01)
(Continued)

(52) U.S. Cl.
CPC ................ *H02M 1/36* (2013.01); *H02J 3/383* (2013.01); *H02M 7/44* (2013.01); *H02S 40/32* (2014.12); *H02S 40/425* (2014.12); *Y02E 10/563* (2013.01)

(58) Field of Classification Search
CPC ............ H02J 3/385; H02J 3/383; H02M 7/44; G05F 1/67; Y02E 10/58
(Continued)

(56) References Cited

U.S. PATENT DOCUMENTS 5,869,956 A * 2/1999 Nagao ....................... G05F 1/67
323/299
5,923,158 A * 7/1999 Kurokami ................. G05F 1/67
323/299
(Continued)

FOREIGN PATENT DOCUMENTS

CN 102355124 A 2/2012
CN 202424496 U 9/2012
(Continued)

OTHER PUBLICATIONS

EP Search Report dated Jan. 27, 2016, for European Patent Application No. 15178967.4.
(Continued)

*Primary Examiner* — Rajnikant Patel
(74) *Attorney, Agent, or Firm* — Conley Rose, P.C.

(57) ABSTRACT

A method for start control of photovoltaic inverter, a system thereof, and a photovoltaic power generation system are provided. A fan of the photovoltaic inverter is controlled to operate in a case that input voltage of the photovoltaic inverter is greater than a start threshold, and the fan operation is used as a load. Input voltage drop before and after the fan operates is obtained, and in a case that the input voltage drop is less than or equal to a voltage determination threshold, the photovoltaic inverter is controlled to start a grid connection. The voltage determination threshold is changed based on a power determination threshold of the photovoltaic inverter.

10 Claims, 4 Drawing Sheets

(51) Int. Cl.
*H02J 3/38* (2006.01)
*H02S 40/32* (2014.01)
*H02M 7/44* (2006.01)
*H02S 40/42* (2014.01)

(58) Field of Classification Search
USPC .... 363/37, 41, 43, 56, 95, 98; 323/222–224, 323/266, 268, 271–274, 282–285; 307/63, 307/64, 66, 80, 82
See application file for complete search history.

(56) References Cited

U.S. PATENT DOCUMENTS

| | | | | |
|---|---|---|---|---|
| 6,046,919 A | * | 4/2000 | Madenokouji | G05F 1/67 323/906 |
| 7,091,707 B2 | * | 8/2006 | Cutler | H02J 3/383 323/268 |
| 7,319,313 B2 | * | 1/2008 | Dickerson | H02J 7/35 323/285 |
| 2012/0192921 A1 | | 8/2012 | Tiittanen et al. | |
| 2015/0091381 A1 | | 4/2015 | Tiittanen et al. | |

FOREIGN PATENT DOCUMENTS

| | | |
|---|---|---|
| CN | 103187863 A | 7/2013 |
| CN | 103560659 A | 2/2014 |
| CN | 103595236 A | 2/2014 |
| CN | 203456880 U | 2/2014 |
| CN | 103715713 A | 4/2014 |
| EP | 2482626 A1 | 8/2012 |
| EP | 2566031 A1 | 3/2013 |
| JP | H08182343 A | 7/1996 |

OTHER PUBLICATIONS

Second Chinese Office Action dated Jul. 13, 2016 with English summary (7 pages).
Chinese First Office Action dated Nov. 4, 2015, for priority patent application CN 201410427714.0.

* cited by examiner

METHOD FOR STARTUP CONTROL OF PHOTOVOLTAIC INVERTER, SYSTEM THEREOF, AND PHOTOVOLTAIC POWER GENERATION SYSTEM

CROSS-REFERENCE TO RELATED APPLICATION

This application claims priority of Chinese Patent Application No. 201410427714.0 titled as "METHOD FOR STARTUP CONTROL OF PHOTOVOLTAIC INVERTER, SYSTEM THEREOF, AND PHOTOVOLTAIC POWER GENERATION SYSTEM" and filed on Aug. 27, 2014, the entirety of which is incorporated by reference herein.

TECHNICAL FIELD

The disclosure relates to the field of photovoltaic power generation, and in particular to a method for startup control of a photovoltaic inverter, a system thereof, and a photovoltaic power generation system.

BACKGROUND

As a main renewable technology, photovoltaic power generation technology is widely used in many countries and regions. In photovoltaic power generation technology, a photovoltaic panel is used to absorb solar energy and convert the solar energy into direct current, and through maximum power tracking by the photovoltaic inverter, the maximum direct current outputted by the photovoltaic panel is converted into alternating current for the use of loads.

The photovoltaic power generation technology is directly related to sunray. With the gradual enhancement of solar irradiance in the morning, the voltage outputted by a photovoltaic array rises. The photovoltaic inverter begins grid-connected operation when the voltage reaches a startup voltage needed for the photovoltaic inverter to operate. With the gradual weakening of solar irradiance at sunset, open-circuit voltage and energy of the photovoltaic panel gradually decrease, and at the moment, the power outputted by the photovoltaic inverter gradually reduces. In a case that the power outputted by the photovoltaic inverter is lower than a predetermined threshold, the photovoltaic inverter tries to shut down, disconnecting a grid-side relay.

At present, the method for startup control of a photovoltaic inverter includes determining the startup of the photovoltaic inverter based on the magnitude of the input voltage of the photovoltaic panel PV, i.e., in a case that the input voltage is greater than a predetermined threshold, starting the relay into grid-connected operation. However, according to this method, only the magnitude of the input voltage is considered, while the magnitude of the input energy is not considered. Problems of repeated startup and shutdown occur, which greatly affects the service life of the grid-connected relay.

SUMMARY

In view of this, a method for startup control of a photovoltaic inverter, a system thereof, and a photovoltaic power generation system are provided in the disclosure, to solve the problem of service life reduction caused by repeated startup and shutdown when determining whether to initiate grid-connected operation of a relay based on the magnitude of the input voltage. The solution is as follows.

A method for startup control of a photovoltaic inverter includes:
obtaining a value of an input voltage of the photovoltaic inverter;
starting a fan of the photovoltaic inverter in a case that the value of the input voltage of the photovoltaic inverter is greater than a startup threshold, where the fan is powered by an input side of the photovoltaic inverter;
obtaining a further value of the input voltage of the photovoltaic inverter after the startup of the fan;
obtaining a voltage drop of the input voltage based on the value of the input voltage of the photovoltaic inverter and the further value of the input voltage of the photovoltaic inverter after the startup of the fan; and
initiating grid-connected operation of the photovoltaic inverter in a case that the voltage drop of the input voltage is less than or equal to a voltage determination threshold, and the voltage determination threshold is changed based on a power determination threshold of the photovoltaic inverter.

Further, the voltage determination threshold is changed based on the power determination threshold of the photovoltaic inverter as follows:
obtaining an input power of a photovoltaic panel when the photovoltaic inverter operates at a maximum power during the photovoltaic inverter performing the grid-connected operation for the first time in a day;
determining whether the input power of the photovoltaic panel is greater than the power determination threshold;
increasing a first voltage determination threshold by a fixed voltage step if the input power of the photovoltaic panel is greater than the power determination threshold, where the first voltage determination threshold is the voltage determination threshold for initiating grid-connected operation of the photovoltaic inverter last time;
decreasing the first voltage determination threshold by a fixed voltage step if the input power of the photovoltaic panel is not greater than the power determination threshold; and
setting the first voltage determination threshold increased or decreased by the fixed voltage step as a second voltage determination threshold to be used as the voltage determination threshold for the next startup of the photovoltaic inverter.

Further, the method includes storing the second voltage determination threshold.

Further, the method includes: increasing the first voltage determination threshold by the fixed voltage step, and setting an upper limit value of the voltage determination threshold.

Further, the method includes: decreasing the first voltage determination threshold by the fixed voltage step, and setting a lower limit value of the voltage determination threshold.

A system for startup control of a photovoltaic inverter includes a first obtaining unit, a control unit connected to the first obtaining unit, a second obtaining unit connected to the control unit, and a determining unit connected to the second obtaining unit, wherein
the first obtaining unit is configured to obtain a value of an input voltage of the photovoltaic inverter;
the control unit is configured to start a fan of the photovoltaic inverter in a case that the value of the input voltage of the photovoltaic inverter is greater than a startup threshold, wherein the fan is powered by an input side of the photovoltaic inverter;

the second obtaining unit is configured to obtain a further value of the input voltage of the photovoltaic inverter after the startup of the fan, and obtain a voltage drop of the input voltage based on the value of the input voltage of the photovoltaic inverter and the further value of the input voltage of the photovoltaic inverter after the startup of the fan; and the determining unit is configured to initiate grid-connected operation of the photovoltaic inverter in a case that the voltage drop of the input voltage is less than or equal to a voltage determination threshold, and the determining unit changes the voltage determination threshold based on a power determination threshold of the photovoltaic inverter.

Further, the determining unit changes the voltage determination threshold based on a power determination threshold of the photovoltaic inverter as follows.

The determining unit obtains an input power of a photovoltaic panel when the photovoltaic inverter operates at a maximum power during the photovoltaic inverter performing the grid-connected operation for the first time in a day, and determines whether the input power of the photovoltaic panel is greater than the power determination threshold; the first voltage determination threshold is increased by a fixed voltage step if the input power of the photovoltaic panel is greater than the power determination threshold, where the first voltage determination threshold is the voltage determination threshold for initiating grid-connected operation of the photovoltaic inverter last time; the first voltage determination threshold is decreased by the fixed voltage step if the input power of the photovoltaic panel is not greater than the power determination threshold; and the first voltage determination threshold increased or decreased by the fixed voltage step is set as a second voltage determination threshold to be used as the voltage determination threshold for the next startup of the photovoltaic inverter.

Further, the system includes a storage unit connected to the control unit, where the storage unit is configured to store the second voltage determination threshold.

Further, the system includes a setting unit connected to the determining unit, where the setting unit is configured to set an upper limit value of the voltage determination threshold when the first voltage determination threshold is increased by the fixed voltage step, and set a lower limit value of the voltage determination threshold when the first voltage determination threshold is decreased by the fixed voltage step.

A photovoltaic power generation system includes a photovoltaic panel, a controller, a speed regulation device connected to both the photovoltaic panel and the controller, a photovoltaic inverter connected to the speed regulation device, and a load connected to the photovoltaic inverter, where the photovoltaic panel is configured to absorb solar energy, convert the solar energy into direct current, and send the direct current to the photovoltaic inverter;

the controller is configured to control startup and shutdown of the photovoltaic inverter;

the speed regulation device is configured to regulate the rotation speed of a fan of the photovoltaic inverter; and the photovoltaic inverter is configured to convert the direct current from the photovoltaic panel into alternating current for the use of the load through maximum power tracking;

where the controller comprises a first obtaining unit, a control unit connected to the first obtaining unit, a second obtaining unit connected to the control unit, and a determining unit connected to the second obtaining unit, where the first obtaining unit is configured to obtain a value of an input voltage of the photovoltaic inverter;

the control unit is configured to start a fan of the photovoltaic inverter in a case that the value of the input voltage of the photovoltaic inverter is greater than a startup threshold, and the fan is powered by an input side of the photovoltaic inverter;

the second obtaining unit is configured to obtain a further value of the input voltage of the photovoltaic inverter after the startup of the fan, and obtain a voltage drop of the input voltage based on the value of the input voltage of the photovoltaic inverter and the further value of the input voltage of the photovoltaic inverter after the startup of the fan; and the determining unit is configured to initiate grid-connected operation of the photovoltaic inverter in a case that the voltage drop of the input voltage is less than or equal to a voltage determination threshold, and the determining unit changes the voltage determination threshold based on a power determination threshold of the photovoltaic inverter.

It may be seen from the above technical solution that, in the method for startup control of a photovoltaic inverter, the system thereof, and the photovoltaic power generation system, the fan of the photovoltaic inverter starts to operate in a case that the input voltage of the photovoltaic inverter is greater than the startup threshold, and the fan operation is used as a load. The input voltage drop before and after the startup of the fan is obtained, and in a case that the input voltage drop is less than or equal to the voltage determination threshold, the photovoltaic inverter starts grid-connected operation. Since the fan of the photovoltaic inverter is used as a load without connection of dummy load of direct current or alternating current, cost for additional hardware is avoided; in addition, the voltage determination threshold is changed based on the power determination threshold of the photovoltaic inverter, and hence the voltage determination threshold is a dynamic threshold, which varies with an actual situation. The problem of service life reduction caused by frequent startup of the photovoltaic inverter in case of appropriate voltage and small power is solved.

BRIEF DESCRIPTION OF THE DRAWINGS

In order to illustrate the technical solutions according to the exemplary embodiments of the disclosure or in the conventional technology more clearly, the drawings to be used in the description of the embodiments or the conventional technology are described briefly hereinafter. Apparently, the drawings in the following description are only a part of rather than all of the embodiments of the disclosure, and other drawings may be obtained by those skilled in the art according to those drawings without creative effort.

DETAILED DESCRIPTION OF DISCLOSED EMBODIMENTS

Hereinafter, the technical solutions according to the embodiments of the disclosure are described clearly and completely in conjunction with the drawings according to the embodiments of the disclosure. Apparently, the described embodiments are only a part of rather than all of the embodiments of the disclosure. All the other embodiments obtained by those skilled in the art based on the embodiments of the disclosure without creative effort fall within the protection scope of the disclosure.

Figure 1:
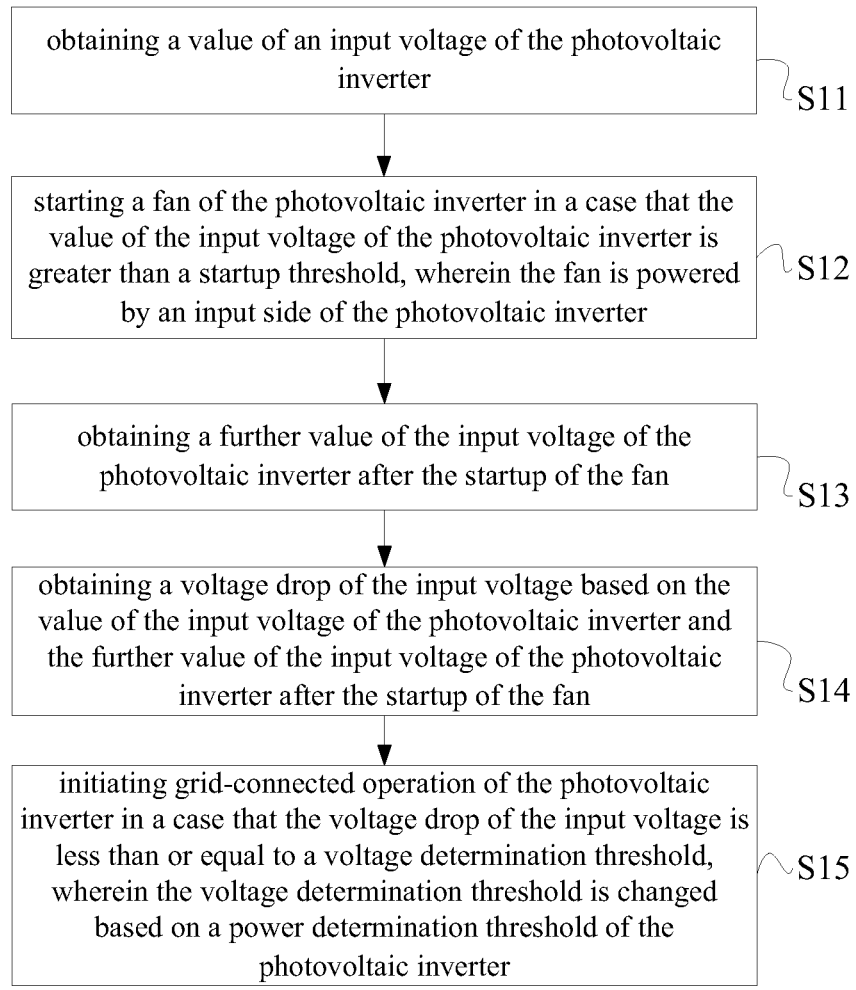
FIG. 1 is a flowchart of a method for startup control of a photovoltaic inverter according to an embodiment of the disclosure.

A method for startup control of a photovoltaic inverter is provided in the disclosure. FIG. 1 is a flow chart of the method. The method includes steps S11-S15.

In step S11, a value of an input voltage of the photovoltaic inverter is obtained.

In step S12, in a case that the value of the input voltage of the photovoltaic inverter is greater than a startup threshold, the fan of the photovoltaic inverter is started. The fan is powered by the input side of the photovoltaic inverter.

In a case that the input voltage of the photovoltaic inverter is greater than the startup threshold, the fan of the photovoltaic inverter operates at full speed. Based on the voltages before and after the startup of the fan, it is determined whether to start the photovoltaic inverter. Thus, additional load is avoided. In a case that it is determined to start the photovoltaic inverter, it is required to disconnect loads before starting the photovoltaic inverter into grid-connected operation.

The fan is powered by the input side of the photovoltaic inverter, so that the values of input voltage at the direct current side differ before and after the startup of the fan.

Through making the fan of the photovoltaic inverter operate, the values of voltage before and after the startup of the fan may be determined, and heat dissipation of the photovoltaic inverter may be achieved.

In step S13, a further value of the input voltage of the photovoltaic inverter after the startup of the fan is obtained;

In step S14, a voltage drop of the input voltage is obtained based on the value of the input voltage of the photovoltaic inverter and the further value after the startup of the fan; and It is determined whether the potential difference meets a requirement based on the voltage drop before and after the startup of the fan.

In step S15, in a case that the voltage drop of the input voltage is less than or equal to a voltage determination threshold, grid-connected operation of the photovoltaic inverter is initiated. The voltage determination threshold may be changed based on a power determination threshold of the photovoltaic inverter.

When the photovoltaic inverter starts grid-connected operation, the input voltage is less than or equal to the voltage determination threshold, and the input voltage is greater than a startup threshold.

The voltage determination threshold is a dynamic value, which may be changed based on different situations to keep the voltage and power of the photovoltaic inverter in a scope for normal operation of the photovoltaic inverter during startup of the photovoltaic inverter. Thus repeated startup and shutdown of the photovoltaic inverter if the voltage meets the requirement but the power does not may be avoided.

In the method for startup control of a photovoltaic inverter according to the embodiment of the disclosure, the fan of the photovoltaic inverter starts to operate in a case that the input voltage of the photovoltaic inverter is greater than the startup threshold, and the fan which is operating is used as a load. The input voltage drop before and after the startup of the fan is obtained, and in a case that the input voltage drop is less than or equal to the voltage determination threshold, the photovoltaic inverter starts grid-connected operation. Since the fan of the photovoltaic inverter is used as a load without connection of dummy load of direct current or alternating current, cost for additional hardware is avoided. In addition, the voltage determination threshold is changed based on the power determination threshold of the photovoltaic inverter, and hence the voltage determination threshold is a dynamic threshold, which varies with an actual situation. The problem of service life reduction caused by frequent startup of the photovoltaic inverter in case of appropriate voltage and small power is solved.

Figure 2:
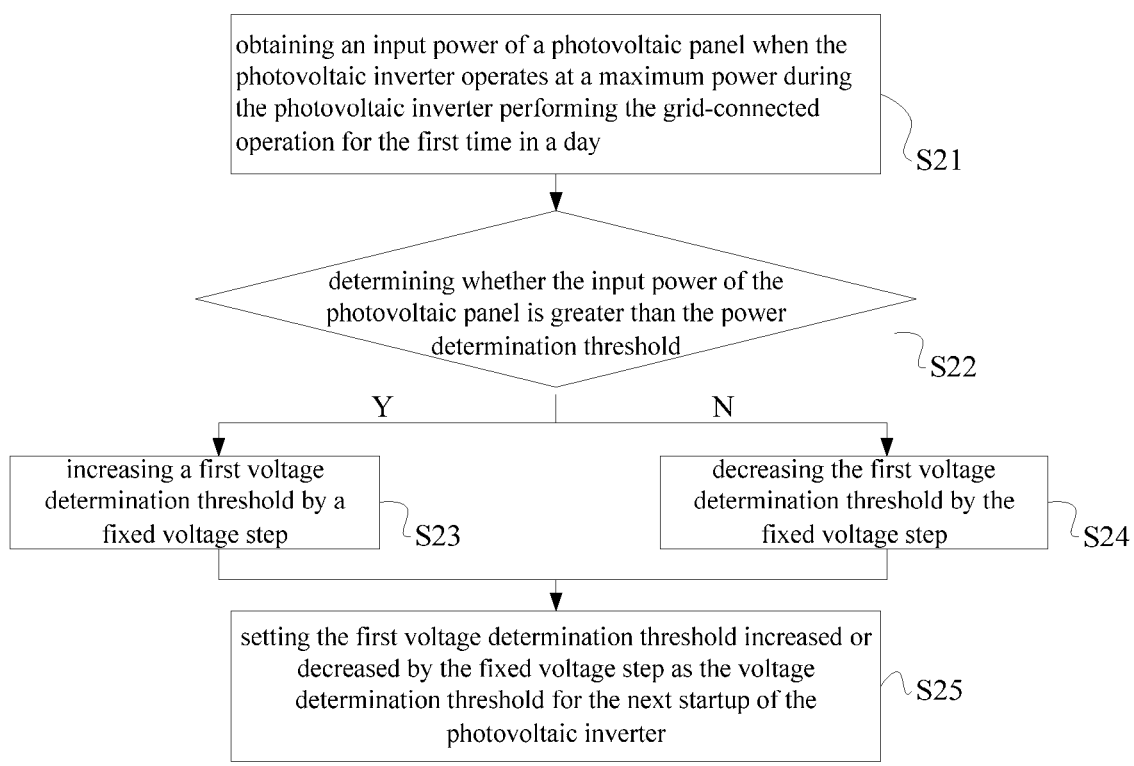
FIG. 2 is a flowchart of a method for changing the voltage determination threshold according to an embodiment of the disclosure.

A method for changing the voltage determination threshold is provided according to an embodiment of the disclosure, and FIG. 2 is a flow chart of the method. The method includes steps S21-S25.

In step S21, an input power of a photovoltaic panel is obtained.

Specifically, the input power is obtained when the photovoltaic inverter operates at a maximum power during the photovoltaic inverter performs the grid-connected operation for the first time in a day.

In step S22, it is determined whether the input power of the photovoltaic panel is greater than a power determination threshold.

The power determination threshold is the minimum power value needed by the photovoltaic inverter to operate normally.

In step S23, if the input power of the photovoltaic panel is greater than the power determination threshold, a first voltage determination threshold is increased by a fixed value (i.e. a step of voltage).

The first voltage determination threshold is the voltage determination threshold for initiating grid-connected operation of the photovoltaic inverter last time.

The first voltage determination threshold is increased by the fixed voltage step to be used as the voltage determination threshold at which the photovoltaic inverter starts the next grid connection. The first voltage determination threshold increased by the fixed voltage step is stored so as to obtain a changed voltage determination threshold when the photovoltaic inverter starts the next grid connection. After the changed voltage determination threshold is obtained for determination operation, the voltage determination threshold is changed further, so that the voltage determination threshold may become an optimized value after repeated startup of grid connection.

At the same time, an upper limit value of the voltage determination threshold is set, to avoid that the first voltage determination threshold exceeds the upper limit value of the startup threshold.

In step S24, if the input power of the photovoltaic panel is not greater than the power determination threshold, the first voltage determination threshold is decreased by a fixed voltage step.

The first voltage determination threshold is decreased by the fixed voltage step to be used as the voltage determination threshold at which the photovoltaic inverter starts the next grid connection. The first voltage determination threshold decreased by the fixed voltage step is stored so as to obtain a changed voltage determination threshold when the photovoltaic inverter starts the next grid connection. After the changed voltage determination threshold is obtained for determination operation, the voltage determination threshold is changed further, so that the voltage determination threshold may become the optimized value after repeated startup of grid connection.

At the same time, a lower limit value of the voltage determination threshold is set, to avoid that the first voltage determination threshold exceeds the lower limit value of the startup threshold.

In step S25, the first voltage determination threshold increased or decreased by the fixed voltage step is set as the voltage determination threshold for the next startup of the photovoltaic inverter.

The first voltage determination threshold increased or decreased by the fixed voltage step is set as a second voltage determination threshold, and the second voltage determination threshold is used as the voltage determination threshold for the next startup of the photovoltaic inverter.

In the method for changing the voltage determination threshold according to the embodiment of the disclosure, the voltage determination threshold is changed based on the power determination threshold and the last first voltage determination threshold, to be used for the next grid connection of the photovoltaic inverter. The voltage determination threshold may be optimized after changes, avoiding the problem of service life reduction caused by frequent startup of the photovoltaic inverter in case of appropriate voltage and small power.

Figure 3:
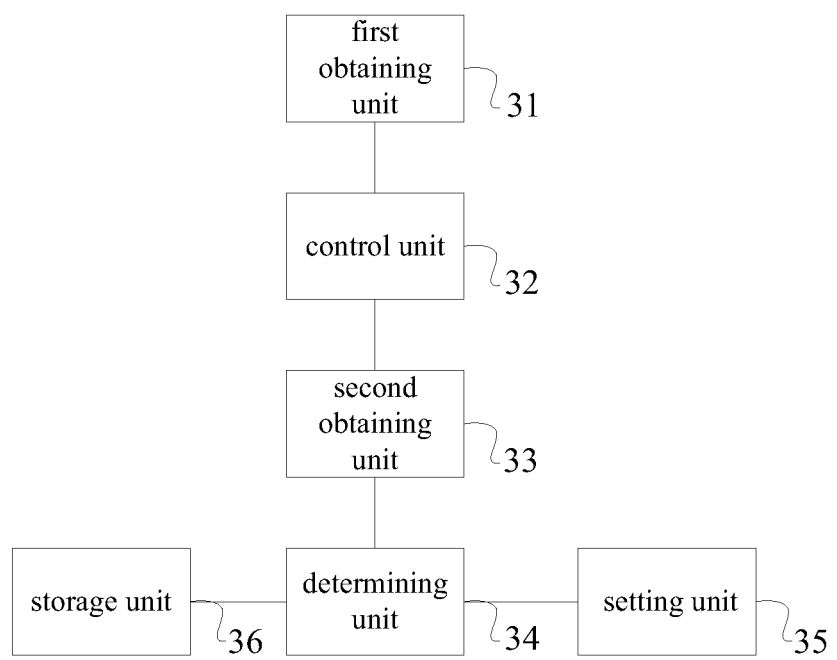
FIG. 3 is a structural diagram of a startup control system of a photovoltaic inverter according to an embodiment of the disclosure.

A system for startup control of a photovoltaic inverter is provided according to the embodiment of the disclosure. FIG. 3 is the structural diagram of the system.

The system includes a first obtaining unit 31, a control unit 32 connected to the first obtaining unit 31, a second obtaining unit 33 connected to the control unit 32, and a determining unit 34 connected to the second obtaining unit 33.

The first obtaining unit 31 is configured to obtain a value of an input voltage of a photovoltaic inverter.

The control unit 32 is configured to start a fan of the photovoltaic inverter in a case that the value of the input voltage of the photovoltaic inverter is greater than a startup threshold. The fan is powered by the input side of the photovoltaic inverter.

In a case that the input voltage of the photovoltaic inverter is greater than a startup threshold, the fan of the photovoltaic inverter operates at full speed. Based on the voltages before and after the startup of the fan, it is determined whether to start the photovoltaic inverter. Thus additional load is avoided. In a case that it is determined to start the photovoltaic inverter, it is required to disconnect loads before starting the photovoltaic inverter into grid-connected operation.

The fan is powered by the input side of the photovoltaic inverter, so that the values of input voltage at the direct current side differ before and after the startup of the fan.

Through making the fan of the photovoltaic inverter operate, the values of voltage before and after the startup of the fan may be determined, and heat dissipation of the photovoltaic inverter may be achieved.

The second obtaining unit 33 is configured to obtain a further value of input voltage of the photovoltaic inverter after the startup of the fan, and obtain a voltage drop of the input voltage based on the value of the input voltage of the photovoltaic inverter and the further value after the startup of the fan.

The determining unit 34 is configured to initiate grid-connected operation of the photovoltaic inverter in a case that the voltage drop of the input voltage is less than or equal to a voltage determination threshold, and the determining unit 34 changes the voltage determination threshold based on a power determination threshold of the photovoltaic inverter.

The voltage determination threshold is a dynamic value, which may be changed based on different situations, to keep the voltage and power of the photovoltaic inverter in a scope for normal operation of the photovoltaic inverter during startup of the photovoltaic inverter. Thus repeated startup and shutdown of the photovoltaic inverter if the voltage meets the requirement but the power does not may be avoided.

Further, the determining unit 34 changes the voltage determination threshold based on the power determination threshold of the photovoltaic inverter as follows.

The determining unit 34 obtains input power of a photovoltaic panel, and determines whether the input power of the photovoltaic panel is greater than the power determination threshold; the first voltage determination threshold is increased by a fixed voltage step if the input power of the photovoltaic panel is greater than the power determination threshold, where the first voltage determination threshold is the voltage determination threshold for initiating grid-connected operation of the photovoltaic inverter last time; the first voltage determination threshold is decreased by the fixed voltage step if the input power of the photovoltaic panel is not greater than the power determination threshold, and the first voltage determination threshold increased or decreased by the fixed voltage step is set as a second voltage determination threshold to be used as the voltage determination threshold for the next startup of the photovoltaic inverter.

The system for start control of photovoltaic inverter according to the embodiment of the disclosure may further include a storage unit 36, where the storage unit 36 is configured to store the second voltage determination threshold.

The first voltage determination threshold which is increased by the fixed voltage step to be used as the voltage determination threshold at which the photovoltaic inverter starts the next grid connection. The first voltage determination threshold increased by the fixed voltage step is stored so as to obtain a changed voltage determination threshold when the photovoltaic inverter starts the next grid connection. After the changed voltage determination threshold is obtained for determination operation, the voltage determination threshold is changed further, so that the voltage determination threshold may become an optimized value after repeated startup of grid connection.

The system for startup control of photovoltaic inverter according to the embodiment of the disclosure may further include a setting unit 35, where the setting unit 35 is configured to set an upper limit value of the voltage determination threshold, to avoid that the first voltage determination threshold exceeds the upper limit value of the startup threshold.

In addition, the first voltage determination threshold decreased by the fixed voltage step to be used as the voltage determination threshold at which the photovoltaic inverter starts the next grid connection. The first voltage determination threshold decreased by the fixed voltage step is stored so as to obtain a changed voltage determination threshold when the photovoltaic inverter starts the next grid connection. After the changed voltage determination threshold is obtained for determination operation, the voltage determination threshold is changed further, so that the voltage determination threshold may become the optimized value after repeated startup of grid connection.

At the same time, the setting unit 35 is configured to set a lower limit value of the voltage determination threshold, to avoid that the first voltage determination threshold exceeds the lower limit value of the startup threshold.

In the system for startup control of a photovoltaic inverter according to the embodiment of the disclosure, the fan of the photovoltaic inverter starts to operate in a case that the input voltage of the photovoltaic inverter is greater than the startup threshold, and the fan which is operating is used as a load. The input voltage drop before and after the startup of the fan is obtained, and in a case that the input voltage drop is less than or equal to the voltage determination threshold, the photovoltaic inverter starts grid-connected operation. Since the fan of the photovoltaic inverter is used as a load without connection of dummy load of direct current or alternating current, cost for additional hardware is avoided. In addition, the voltage determination threshold is changed based on the power determination threshold of the photovoltaic inverter, and hence the voltage determination threshold is a dynamic threshold, which varies with an actual situation. The problem of service life reduction caused by frequent startup of the photovoltaic inverter in case of appropriate voltage and small power is solved.

Figure 4:
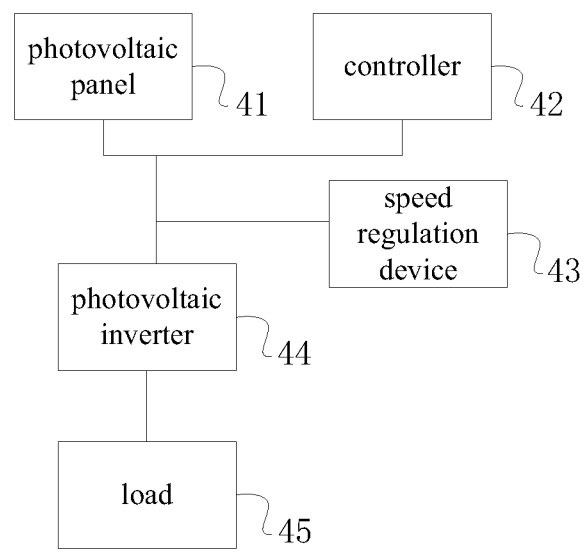
FIG. 4 is a structural diagram of a photovoltaic power generation system according to an embodiment of the disclosure.

A photovoltaic power generation system is provided according to an embodiment of the disclosure, and the structural diagram is shown in FIG. 4.

The system includes: a photovoltaic panel 41, a controller 42, a speed regulation device 43 connected to the photovoltaic panel 41 and the controller 42, a photovoltaic inverter 44 connected to the photovoltaic panel 41 and the controller 42 respectively, and a load 45 connected to the photovoltaic inverter 44.

The photovoltaic panel 41 is configured to absorb solar energy, convert the solar energy into direct current, and send the direct current to the photovoltaic inverter 44.

The controller 42 is configured to control startup and shutdown of the photovoltaic inverter 44.

The speed regulation device 43 is configured to regulate rotation speed of a fan of the photovoltaic inverter.

The photovoltaic inverter 44 is configured to convert the direct current from the photovoltaic panel 41 into alternating current for the use of load 45 through maximum power tracking.

The controller 42 includes a first obtaining unit, a control unit connected to the first obtaining unit, a second obtaining unit connected to the control unit, and a determining unit connected to the second obtaining unit. The controller has the same structure and the same function as the system for startup control of photovoltaic inverter shown in FIG. 3.

The first obtaining unit is configured to obtain value of input voltage of the photovoltaic inverter.

The control unit is configured to start a fan of the photovoltaic inverter in a case that the value of the input voltage of the photovoltaic inverter is greater than a startup threshold. The fan is powered by an input side of the photovoltaic inverter.

In a case that the input voltage of the photovoltaic inverter is greater than a startup threshold, the fan of the photovoltaic inverter operates at full speed. Based on the voltages before and after the startup of the fan, it is determined whether to start the photovoltaic inverter. Thus additional load is avoided. In a case that it is determined to start the photovoltaic inverter, it is required to disconnect loads before starting the photovoltaic inverter into grid-connected operation.

The fan is powered by the input side of the photovoltaic inverter, so that the values of input voltage at a direct current side differ before and after the startup of the fan.

Through making the fan of the photovoltaic inverter operate, the values of voltage before and after the startup of the fan may be determined, and heat dissipation of the photovoltaic inverter may be achieved.

The second obtaining unit is configured to obtain a further value of input voltage of the photovoltaic inverter after the startup of the fan, and obtain a voltage drop of the input voltage based on the value of the input voltage of the photovoltaic inverter and the further value after the startup of the fan.

The determining unit is configured to initiate grid-connected operation of the photovoltaic inverter in a case that the voltage drop of the input voltage is less than or equal to a voltage determination threshold, and the determining unit changes the voltage determination threshold based on a power determination threshold of the photovoltaic inverter.

The voltage determination threshold is a dynamic value, which may be changed based on different situations, to keep the voltage and power of the photovoltaic inverter t in a scope for normal operation of the photovoltaic inverter during startup of the photovoltaic inverter. Thus repeated startup and shutdown of the photovoltaic inverter if the voltage meets the requirement but the power does not may be avoided.

Further, the determining unit changes the voltage determination threshold based on the power determination threshold of the photovoltaic inverter as follows.

The determining unit obtains input power of the photovoltaic panel, and determines whether the input power of the photovoltaic panel is greater than the power determination threshold; the first voltage determination threshold is increased by a fixed voltage step if the input power of the photovoltaic panel is greater than the power determination threshold, where the first voltage determination threshold is the voltage determination threshold for initiating grid-connected operation of the photovoltaic inverter last time, the first voltage determination threshold is decreased by the fixed voltage step if the input power of the photovoltaic panel is not greater than the power determination threshold, and the first voltage determination threshold increased or decreased by the fixed voltage step is set as a second voltage determination threshold, to be used as the voltage determination threshold for the next startup of the photovoltaic inverter.

The system for start control of photovoltaic inverter according to the embodiment of the disclosure may further include a storage unit, where the storage unit is configured to store the second voltage determination threshold.

The first voltage determination threshold which is increased by the fixed voltage step to be used as the voltage determination threshold at which the photovoltaic inverter starts the next grid connection. The first voltage determination threshold increased by the fixed voltage step is stored so as to obtain a changed voltage determination threshold when the photovoltaic inverter starts the next grid connection. After the changed voltage determination threshold is obtained for determination operation, the voltage determination threshold is changed further, so that the voltage determination threshold may become the optimized value after repeated startup of grid connection.

The system for startup control of photovoltaic inverter according to the embodiment of the disclosure may further include a setting unit, where the setting unit is configured to set an upper limit value of the voltage determination threshold, to avoid that the first voltage determination threshold exceeds the upper limit value of the startup threshold.

In addition, the first voltage determination threshold decreased by the fixed voltage step to be used as the voltage determination threshold at which the photovoltaic inverter starts the next grid connection. The first voltage determination threshold decreased by the fixed voltage step is stored so as to obtain a changed voltage determination threshold when the photovoltaic inverter starts the next grid connection. After the changed voltage determination threshold is obtained for determination operation, the voltage determination threshold is changed further, so that the voltage determination threshold may become the optimized value after repeated startup of grid connection.

At the same time, the setting unit is configured to set a lower limit value of the voltage determination threshold, to avoid that the first voltage determination threshold exceeds the lower limit value of the startup threshold.

The photovoltaic power generation system according to the embodiment of the disclosure includes a controller. The controller controls the fan of the photovoltaic inverter to start to operate in a case that the controller determines through the control unit that input voltage of the photovoltaic inverter is greater than a startup threshold, and the fan which is operating is used as a load. The input voltage drop before and after the startup of the fan is obtained, and in a case that the input voltage drop is less than or equal to a voltage determination threshold, the photovoltaic inverter starts grid-connected operation. Since the fan of the photovoltaic inverter is used as a load without connection of dummy load of direct current or alternating current, cost for additional hardware is avoided. In addition, the voltage determination threshold is changed based on a power determination threshold of the photovoltaic inverter, and hence the voltage determination threshold is a dynamic threshold, which varies with an actual situation. The problem of service life reduction caused by frequent startup of the photovoltaic inverter in case of appropriate voltage and small power is solved.

The embodiments of the disclosure are described in a progressive manner, each embodiment focuses on a difference from other embodiments, and for a same or similar part, the embodiments may refer to each other. For the apparatus according to the embodiments, it corresponds to the method according to the embodiments, thus description is brief, and for relevance, the method part may be referred to.

Those skilled in the art may further realize that, the units and algorithm steps in the examples according to the embodiments of the disclosure may be implemented through electronic hardware, computer software or combination of the electronic hardware and computer software. To illustrate interchangeability of the hardware and software clearly, constitution and steps of the examples are generally described based on the function in the above description. Whether these functions are executed through hardware or software exactly, depends on a specific application and a design constraint of the technical solution. Those skilled in the art may use different methods to implement the described function for each specific application, and the implementation should not be considered to exceed the scope of the disclosure.

The units and algorithm steps in the examples according to the embodiments of the disclosure may be implemented through hardware, software module executed by a processor, or combination of the hardware and the software module executed by the processor. The software module may be placed in random access memory (RAM), memory, read-only memory, electrically programmable ROM, electrically erasable programmable read-only memory, register, hard disk, removable disk, CD-ROM, or any other forms of storage medium known in the technology field.

The above description of the exemplary embodiments of the disclosure is to enable those skilled in the art to implement or use the invention claimed below. Various modifications made to the exemplary embodiments are apparent to those skilled in the art, and the general principles defined in the disclosure may be implemented in other embodiments without departing from the spirit and scope of this disclosure. Hence, the invention claimed below is not limited to the embodiments expressly shown or described herein, but conforms to a widest scope consistent with the principles and novel features in the disclosure.

What is claimed is:

1. A method for startup control of a photovoltaic inverter, comprising:
   obtaining a value of an input voltage of the photovoltaic inverter;
   starting a fan of the photovoltaic inverter in a case that the value of the input voltage of the photovoltaic inverter is greater than a startup threshold, wherein the fan is powered by an input side of the photovoltaic inverter;
   obtaining a further value of the input voltage of the photovoltaic inverter after the startup of the fan;
   obtaining a voltage drop of the input voltage based on the value of the input voltage of the photovoltaic inverter and the further value of the input voltage of the photovoltaic inverter after the startup of the fan; and
   initiating grid-connected operation of the photovoltaic inverter in a case that the voltage drop of the input voltage is less than or equal to a voltage determination threshold, wherein the voltage determination threshold is changed based on a power determination threshold of the photovoltaic inverter.

2. The method according to claim 1, wherein changing the voltage determination threshold based on the power determination threshold of the photovoltaic inverter comprises:
   obtaining an input power of a photovoltaic panel when the photovoltaic inverter operates at a maximum power during the photovoltaic inverter performing the grid-connected operation for the first time in a day;
   determining whether the input power of the photovoltaic panel is greater than the power determination threshold;
   increasing a first voltage determination threshold by a fixed voltage step if the input power of the photovoltaic panel is greater than the power determination threshold, wherein the first voltage determination threshold is the voltage determination threshold for initiating grid-connected operation of the photovoltaic inverter last time;
   decreasing the first voltage determination threshold by the fixed voltage step if the input power of the photovoltaic panel is not greater than the power determination threshold; and
   setting the first voltage determination threshold increased or decreased by the fixed voltage step as a second voltage determination threshold to be used as the voltage determination threshold for the next startup of the photovoltaic inverter.

3. The method according to claim 2, further comprising: storing the second voltage determination threshold.

4. The method according to claim 2, further comprising: increasing the first voltage determination threshold by the fixed voltage step, and setting an upper limit value of the voltage determination threshold.

5. The method according to claim 2, further comprising: decreasing the first voltage determination threshold by the fixed voltage step, and setting a lower limit value of the voltage determination threshold.

6. A system for startup control of a photovoltaic inverter, comprising a first obtaining unit, a control unit connected to the first obtaining unit, a second obtaining unit connected to the control unit, and a determining unit connected to the second obtaining unit, wherein
the first obtaining unit is configured to obtain a value of an input voltage of the photovoltaic inverter;
the control unit is configured to start a fan of the photovoltaic inverter in a case that the value of the input voltage of the photovoltaic inverter is greater than a startup threshold, wherein the fan is powered by an input side of the photovoltaic inverter;
the second obtaining unit is configured to obtain a further value of the input voltage of the photovoltaic inverter after the startup of the fan, and obtain a voltage drop of the input voltage based on the value of the input voltage of the photovoltaic inverter and the further value of the input voltage of the photovoltaic inverter after the startup of the fan; and
the determining unit is configured to initiate grid-connected operation of the photovoltaic inverter in a case that the voltage drop of the input voltage is less than or equal to a voltage determination threshold, wherein the determining unit changes the voltage determination threshold based on a power determination threshold of the photovoltaic inverter.

7. The system according to claim 6, wherein the determining unit changes the voltage determination threshold based on a power determination threshold of the photovoltaic inverter comprises:
the determining unit obtaining an input power of a photovoltaic panel when the photovoltaic inverter operates at a maximum power during the photovoltaic inverter performing the grid-connected operation for the first time in a day; determining whether the input power of the photovoltaic panel is greater than the power determination threshold; increasing a first voltage determination threshold by a fixed voltage step if the input power of the photovoltaic panel is greater than the power determination threshold, wherein the first voltage determination threshold is the voltage determination threshold for initiating grid-connected operation of the photovoltaic inverter last time; decreasing the first voltage determination threshold by the fixed voltage step if the input power of the photovoltaic panel is not greater than the power determination threshold; and setting the first voltage determination threshold increased or decreased by the fixed voltage step as a second voltage determination threshold to be used as the voltage determination threshold for the next startup of the photovoltaic inverter.

8. The system according to claim 7, further comprising a storage unit connected to the control unit,
wherein the storage unit is configured to store the second voltage determination threshold.

9. The system according to claim 6, further comprising a setting unit connected to the determining unit,
wherein the setting unit is configured to set an upper limit value of the voltage determination threshold when the first voltage determination threshold is increased by the fixed voltage step, and set a lower limit value of the voltage determination threshold when the first voltage determination threshold is decreased by the fixed voltage step.

10. A photovoltaic power generation system, comprising a photovoltaic panel, a controller, a speed regulation device connected to both the photovoltaic panel and the controller, a photovoltaic inverter connected to the speed regulation device, and a load connected to the photovoltaic inverter, wherein
the photovoltaic panel is configured to absorb solar energy, convert the solar energy into direct current, and send the direct current to the photovoltaic inverter;
the controller is configured to control startup and shutdown of the photovoltaic inverter;
the speed regulation device is configured to regulate the rotation speed of a fan of the photovoltaic inverter;
the photovoltaic inverter is configured to convert the direct current from the photovoltaic panel into alternating current for the use of the load through maximum power tracking; and
the controller comprises a first obtaining unit, a control unit connected to the first obtaining unit, a second obtaining unit connected to the control unit, and a determining unit connected to the second obtaining unit,
the first obtaining unit is configured to obtain a value of an input voltage of the photovoltaic inverter;
the control unit is configured to start a fan of the photovoltaic inverter in a case that the value of the input voltage of the photovoltaic inverter is greater than a startup threshold, and the fan is powered by an input side of the photovoltaic inverter;
the second obtaining unit is configured to obtain a further value of the input voltage of the photovoltaic inverter after the startup of the fan, and obtain a voltage drop of the input voltage based on the value of the input voltage of the photovoltaic inverter and the further value of the input voltage of the photovoltaic inverter after the startup of the fan; and
the determining unit is configured to initiate grid-connected operation of the photovoltaic inverter in a case that the voltage drop of the input voltage is less than or equal to a voltage determination threshold, and the determining unit changes the voltage determination threshold based on a power determination threshold of the photovoltaic inverter.

* * * * *